US012754207B2

(12) United States Patent
Zhao et al.

(10) Patent No.: US 12,754,207 B2
(45) Date of Patent: Oct. 6, 2026

(54) DECOUPLED OPTICAL FORCE NANOSCOPY

(71) Applicant: The Board of Trustees of the University of Illinois, Urbana, IL (US)

(72) Inventors: Yang Zhao, Champaign, IL (US); Yun-Sheng Chen, Champaign, IL (US); Hanwei Wang, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 308 days.

(21) Appl. No.: 18/634,395

(22) Filed: Apr. 12, 2024

(65) Prior Publication Data

US 2024/0345129 A1 Oct. 17, 2024

Related U.S. Application Data

(60) Provisional application No. 63/495,622, filed on Apr. 12, 2023.

(51) Int. Cl.
*G01Q 30/04* (2010.01)
*G01Q 60/32* (2010.01)
*G01Q 60/34* (2010.01)

(52) U.S. Cl.
CPC ............ *G01Q 30/04* (2013.01); *G01Q 60/32* (2013.01)

(58) Field of Classification Search
None
See application file for complete search history.

(56) References Cited

U.S. PATENT DOCUMENTS

| | | | | |
|---|---|---|---|---|
| 7,045,786 | B2 | 5/2006 | Mandelis et al. | |
| 8,418,538 | B2 | 4/2013 | Dazzi et al. | |
| 8,686,359 | B2 | 4/2014 | Zewail | |
| 2021/0011053 | A1 * | 1/2021 | Dazzi | G01N 21/3563 |
| 2025/0290948 | A1 * | 9/2025 | Wagner | G01Q 10/065 |

OTHER PUBLICATIONS

Ando, Toshio, et al. "A high-speed atomic force microscope for studying biological macromolecules." Proceedings of the National Academy of Sciences 98.22 (2001): 12468-12472.
Bai, Yeran, et al. "Ultrafast chemical imaging by widefield photothermal sensing of infrared absorption." Science advances 5.7 (2019): eaav7127.
Chae, Jungseok, et al. "Nanophotonic atomic force microscope transducers enable chemical composition and thermal conductivity measurements at the nanoscale." Nano letters 17.9 (2017): 5587-5594.

(Continued)

*Primary Examiner* — Eliza W Osenbaugh-Stewart
(74) *Attorney, Agent, or Firm* — Quarles & Brady LLP

(57) ABSTRACT

Decoupled optical force nanoscopy allows for measurements of optical forces with nanoscale spatial and temporal resolution. A sample is illuminated with temporally modulated laser light. Optical force data are measured by scanning a cantilever (e.g., of a scanning probe microscope) over the sample to measure optical forces generated by illuminating the sample with the temporally modulated laser light. The optical force data are analyzed in the frequency domain to separate the optical force data into different components, such as photothermal force components, optical gradient force components, photoacoustic force components, and the like.

13 Claims, 10 Drawing Sheets

(56) References Cited

OTHER PUBLICATIONS

Jahng, Junghoon, Eric O. Potma, and Eun Seong Lee. "Tip-enhanced thermal expansion force for nanoscale chemical imaging and spectroscopy in photoinduced force microscopy." Analytical chemistry 90.18 (2018): 11054-11061.
Kodera, Noriyuki, et al. "Video imaging of walking myosin V by high-speed atomic force microscopy." Nature 468.7320 (2010): 72-76.
Lahiri, Basudev, et al. "Nanoscale imaging of plasmonic hot spots and dark modes with the photothermal-induced resonance technique." Nano letters 13.7 (2013): 3218-3224.
Mauser, Kelly W., et al. "Employing cathodoluminescence for nanothermometry and thermal transport measurements in semiconductor nanowires." ACS nano 15.7 (2021): 11385-11395.
Nowak, Derek, et al. "Nanoscale chemical imaging by photoinduced force microscopy." Science advances 2.3 (2016): e1501571.
O'Callahan, Brian T., et al. "Photoinduced tip-sample forces for chemical nanoimaging and spectroscopy." Nano letters 18.9 (2018): 5499-5505.
Pohl, Dieter W., Winfried Denk, and Mark Lanz. "Optical stethoscopy: Image recording with resolution λ/20." Applied physics letters 44.7 (1984): 651-653.
Sytwu, Katherine, et al. "Driving energetically unfavorable dehydrogenation dynamics with plasmonics." Science 371.6526 (2021): 280-283.
Shen, Sheng, Arvind Narayanaswamy, and Gang Chen. "Surface phonon polaritons mediated energy transfer between nanoscale gaps." Nano letters 9.8 (2009): 2909-2913.
Shen, Sheng, et al. "Polyethylene nanofibres with very high thermal conductivities." Nature nanotechnology 5.4 (2010): 251-255.
Tang, Fuguang, Peite Bao, and Zhaohui Su. "Analysis of nanodomain composition in high-impact polypropylene by atomic force microscopy-infrared." Analytical chemistry 88.9 (2016): 4926-4930.
Tumkur, Thejaswi U., et al. "Photoinduced force mapping of plasmonic nanostructures." Nano letters 16.12 (2016): 7942-7949.
Wang, Hanwei, et al. "Ultrafast optical force nanoscopy." Plasmonics: Design, Materials, Fabrication, Characterization, and Applications XX. SPIE, 2022.
Zhao, Yang, et al. "Nanoscopic control and quantification of enantioselective optical forces." Nature nanotechnology 12.11 (2017): 1055-1059.

* cited by examiner

Optical gradient force

Photothermal force

Photoacoustic force

DECOUPLED OPTICAL FORCE NANOSCOPY

STATEMENT OF FEDERALLY SPONSORED RESEARCH

This invention was made with government support under GM139022 awarded by the National Institutes of Health. The government has certain rights in the invention.

BACKGROUND

The photothermal effect of nanoparticles, represented by the elevated temperature due to the resonant optical absorption, has been widely employed in photoacoustic imaging, photothermal therapy, and photothermal microscopy. Plasmonic nanoparticles are one of the primary targets that have been employed in this application due to their convenience in surface functionalization, chemical inertness, and tunable absorption resonances; however, their photothermal effect has been routinely characterized using bulk measurements that overlook nearfield effects. In addition to photoacoustic imaging and photothermal therapy, transient photothermal effects have been used to inactivate bacteria, stimulate neurons, and deliver drugs.

Although scanning probe microscopy and electron microscopy provide single-particle imaging of the photothermal field in ambient and vacuum environments, the relatively slow speed of both techniques limits the observation in the millisecond to second regimes. As a result, the nanosecond-dynamic processes of the transient photothermal effect in the nanoscale have yet to be observed.

SUMMARY OF THE DISCLOSURE

It is an aspect of the present disclosure to provide a method for optical force nanoscopy. The method includes exciting a sample with an excitation light source modulated in the time domain. Optical force data are generated by measuring, using a scanning probe microscope. The optical forces from the sample are generated by exciting the sample with a light source (e.g., the excitation light source). Photothermal force data are generated by processing the optical force data with a computer system to separate the photothermal force from the other optical force components based on the phase distribution of the optical force data. The photothermal force data may then be stored with the computer system.

It is another aspect of the present disclosure to provide a method for decoupled optical force nanoscopy. The method includes illuminating a sample with temporally modulated laser light. Optical force data are acquired by scanning a probe over the sample to measure the optical forces generated by illuminating the sample with the temporally modulated laser light. The optical force data are analyzed in the frequency domain to separate the optical force data into different components. The separated components of the optical force data may then be stored.

BRIEF DESCRIPTION OF THE DRAWINGS

FIG. 2A illustrates a cross-section of the sample slides. A 10 μm-diameter optical window is fabricated on the glass slides with photolithography, E-beam physical vapor deposition of 200 nm of nickel, and lift-off. 200 nm of PMMA is spin-coated and cured on top of the Ni-layer. Finally, gold nanorods are deposited on the sample slides through drop casting within the optical window and dried in a vacuum oven at room temperature. FIG. 2B illustrates a top-view microscopy picture of the sample slide with an AFM tip engaged. During optical force measurements, the AFM tip is aligned with the bottom illumination laser. FIG. 2C is an example AFM image of the optical window.

FIG. 5B illustrates that in the frequency domain, the optical gradient force is negative and pure real; the photothermal force is complex; and the photoacoustic force is positive and pure imaginary.

FIG. 6A (top) shows schematics of the tip-sample interaction with the repulsive mode (blue) and the attractive mode (red) regimes. Amplitude (FIG. 6A, middle) and phase (FIG. 6A, bottom) of the measured tuning curve of the cantilever at different laser intensities are also shown. The resonance is shifted due to the back action of the photothermal expansion. The error bars indicate the standard deviation, and the data points indicate the mean values of three measurements. FIG. 6B shows the theoretical magnitude of the repulsive and attractive $$Z^{\pm}_{opt}$$

modes. Norm. Amp.: Normalized amplitude. $f_0$ is the mechanical resonance frequency of the cantilever, $f_d$ is the piezo dithering frequency, and $f_{opt}$ is the laser frequency. FIG. 6C illustrates the theoretical phase of the $Z^{\pm}_{opt}$ modes. FIG. 6D is the amplitude and phase as shown in FIG. 6B and FIG. 6C. FIG. 6E is the measured magnitude of the cantilever's deflection at $f_{opt}$ versus the piezo's frequency and optical frequency. The dashed line is at $f_{opt}-f_o$ of −1.5 kHz. FIG. 6F shows measured phase of the deflection at $f_{opt}$. FIG. 6G shows measured amplitude and phase at the line shown in FIGS. 6E and 6F.

FIG. 7A shows the average elevated temperature of a nanorod and the laser intensity as a function of time within one period. Simulated thermal expansion at the time frame of 100 ns (with respect to the beginning of the optical pulse) (FIG. 7B), 300 ns (FIG. 7C), 1000 ns (FIG. 7D), 1500 ns (FIG. 7E), and 2900 ns (FIG. 7F). FIGS. 7G-7K show measured photothermal force map dynamics at $f_{opt}-f_o$ of −1.5 kHz, and $f_d-f_0$ of 0.95 kHz, 0.75 kHz, 0.65 kHz, 0.25 kHz, and −0.15 kHz respectively. The free air amplitude used in this example is 100 mV, which corresponds to 15.9 nm. The measurement uses a setpoint of 70%.

FIG. 8A illustrates AFM topography of a nanorod. FIG. 8B shows the overall force map of the nanorod, $F_{opt}(\vec{r})$. The illumination is left-handed circularly polarized. The field of view is 150 nm by 150 nm. FIG. 8C shows the phase of the optical force with the background phase correction $\phi_{opt}(\vec{r})-\phi_{PA}+90°$. The optical gradient force, $F_G(\vec{r})$, is dominant at two ends of the nanorod, where the phase is close to 180 degrees. The photothermal force, $F_{PT}(\vec{r})$, is dominant at the body of the nanorod, where the phase is between 0 and 90 degrees. The photoacoustic force is dominant outside of the nanorod, where the phase is around 90 degrees. The decoupled amplitude of the measured photothermal force and the optical gradient force are shown in FIGS. 8D and 8E, respectively. FIG. 8F illustrates the measured decoupled optical gradient force and photothermal force along the dashed line as shown in FIGS. 8D and 8E, respectively. Simulated photothermal force map (FIG. 8G) and optical gradient force map (FIG. 8H) at 100 ns after the raising edge are also illustrated. FIG. 8I shows the line profile of simulated optical gradient and photothermal forces along the dashed line as shown in FIGS. 8G and 8H, respectively. FIG. 8J shows the measured optical force spectra on the substrate (black), at the end (red), and the center (blue) of the nanorod, as indicated in FIG. 8A. The laser modulation, $f_{opt}$, is at the same frequency as the mechanical resonance frequency of the cantilever, $f_0$. The frequency difference $f_{opt}-f_0$ used in this example is 1 kHz. The error bars indicate the standard deviation, and the data points indicate the mean values of three measurements. FIG. 8K shows the simulated optical force spectra at the end and the center of the nanorod are given by the optical gradient force and the photothermal force, respectively.

DETAILED DESCRIPTION

Figure 1A:
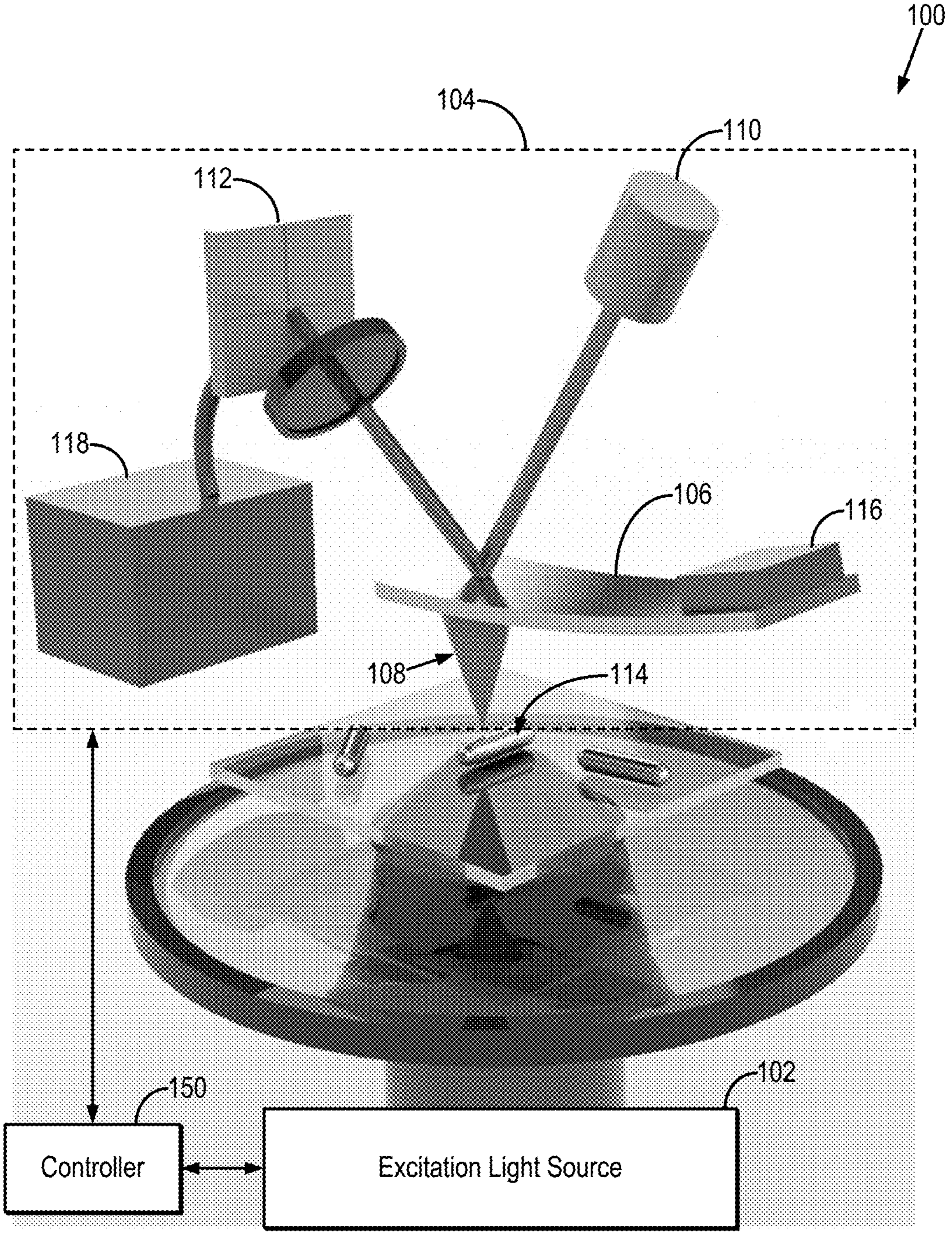
FIG. 1A illustrates an example decoupled optical force nanoscopy system.

Described here are systems and methods for microscopy techniques that are capable of resolving individual particles with nanometer spatial resolution and nanosecond temporal resolution. In general, the disclosed systems and methods are capable of decoupling the photothermal force from the optical gradient force and/or other optical forces. Accordingly, the disclosed techniques may be referred to as decoupled optical force nanoscopy. The decoupling of the photothermal forces from the other optical forces may be realized by using an optical waveform excitation that is specifically tuned, such that the photothermal and optical gradient forces have unique phase responses. Based on these unique phase responses, the photothermal forces can be delineated from other optical forces.

There are primarily three types of optical forces: photothermal force, photoacoustic force, and radiation pressure (positive due to forward scattering and negative due to optical gradient). As mentioned above, the systems and methods described in the present disclosure are capable of decoupling the photothermal force from the optical gradient force and other non-localized forces, such as the photoacoustic force and the scattering force, capitalizing on their unique phase responses under a specific waveform of the optical excitation's temporal modulation.

Accordingly, the disclosed systems and methods can map the photothermal forces with a spatial resolution at the nanometer scale by utilizing the unique phase responses of the photothermal force under a specific temporal modulation profile of light. The back-action of the photothermal effect may also be used to differentiate multiple time frames within a modulation period. Accordingly, dynamic photothermal processes (i.e., photothermal dynamics) can be measured in the nanosecond regime. As a non-limiting example, nanoscale non-stationary thermal diffusion may be visualized using decoupled optical force nanoscopy. It is thus an advantage of the disclosed systems and methods that a single nanoparticle can be imaged on a nanosecond time scale and with nanometer spatial resolution.

It is also an advantage of the systems and methods described in the present disclosure that samples can be spectroscopically studied with a nanoscale spatiotemporal resolution, whether in ambient, aqueous, or vacuum environments. Additionally, these samples can be spectroscopically studied at room temperature, 37° C. (e.g., for biomaterials), or at ultralow temperature. The samples include but are not limited to two-dimensional materials, crystals, and biological samples such as membranes, proteins, DNA, and viruses. Additionally or alternatively, the samples may be single particles, such as single nanoparticles, or molecules.

The capability to decouple optical forces and visualize the ultrafast photothermal processes from a single nanoparticle can facilitate the development of efficient photothermal nano-agents. For example, by varying the nanoparticle's material composition, one can measure different photothermal distributions from the nanoparticle. By monitoring the force components, temporal responses of various forces can be detected in nanosecond resolution.

Another advantage of the present disclosure is that a decoupled optical force map can be generated for a sample. By acquiring a decoupled optical force map with a high spatiotemporal resolution. The decoupled optical force maps can be used to optimize the design of artificial nanodevices, such as integrated nanophotonics, photonic crystals, optical biosensors, metamaterials, and two-dimensional materials.

By fabricated atomic force microscope (AFM) probes or samples, the disclosed systems and methods can also be used to investigate otherwise difficult-to-observe physical phenomena involving light-matter interactions, such as spin-orbital coupling of photons, emission spectra of nanophotonic devices, superchiral light formed by thin film materials, optomechanical damping, back-action of photothermal effects, optomechanical soliton in microcavities, and chemical reactions with photocatalysts.

As a non-limiting example, the decoupled optical force nanoscopy techniques of the present disclosure can be described with respect to studying single particles, such as studying photothermal effects from single particles. In this example, since photothermal effects are enhanced in plasmonic samples, the decoupled optical force nanoscopy can be described with respect to plasmonic nanoparticles. In other examples, such as those abovementioned samples other than plasmonic nanoparticles can be measured using decoupled optical force nanoscopy, including nanoparticles, nanocrystals, two-dimensional materials, polymers, photonic devices, biological samples such as cell membranes, proteins, DNA, and viruses.

Plasmonic photothermal effects can be used in various applications, including microscopy, cancer therapy, nano welding, bubble dynamics, particle reshaping, and driving chemical reactions such as dehydrogenation. For instance, in nano welding, the photothermal effect may be used to create seamless connections between nanowires. Additionally or alternatively, photothermal effects related to plasmonic nanoparticles can be used for bubble dynamics, reshaping nanoparticles, or driving chemical reactions.

In these instances, however, there remains a need to monitor the photothermal dynamic. Advantageously, the systems and methods described in the present disclosure can provide the high spatial and temporal resolution necessary to monitor these dynamic photothermal processes.

Figure 1B:
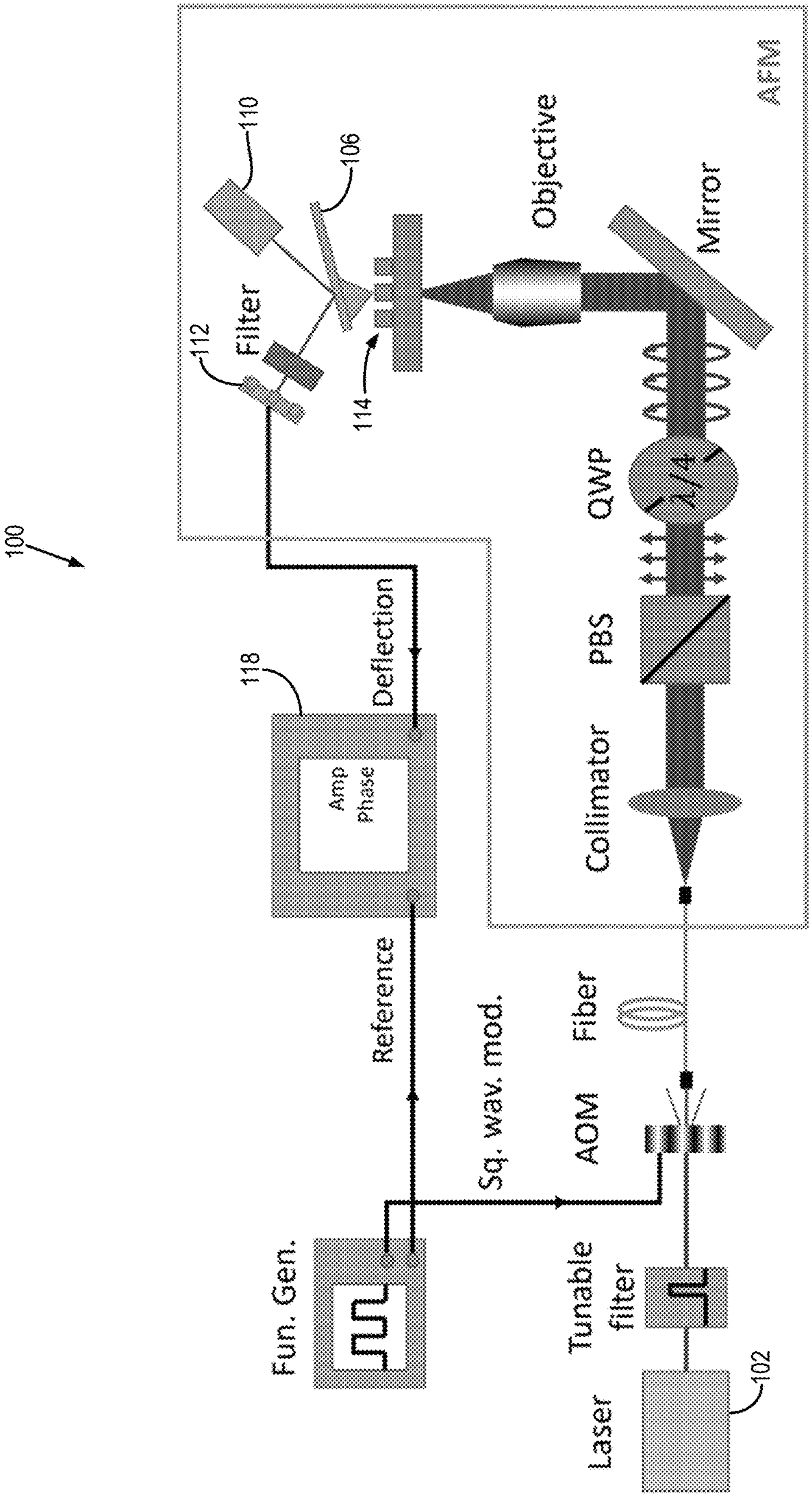
FIG. 1B is a schematic illustration of an example decoupled optical force nanoscopy system setup. The AFM region indicates the temperature and vibration control chamber of the optical force detector. Fun. Gen.: function generator; Sq. way. mod: square wave modulation; AOM: acoustic optical modulator; Amp: amplitude; PBS: polarizing beam splitter; QWP: quarter-wave plate; PD: photodetector.

An example system for decoupled optical force nanoscopy is illustrated in FIGS. 1A and 1B. The decoupled optical force nanoscopy system 100 generally includes an excitation light source 102 and an optical force detector 104. In the illustrated example, the decoupled optical force nanoscopy system 100 is configured as an inverted optical microscope that allows modulated and polarization-controlled illumination of a sample from the bottom and is integrated with an optical force probe that probes the sample from the top.

As described above, the decoupled optical force nanoscopy system 100 probes optical forces originating from the interactions between the illuminated sample (e.g., nanoparticle(s)) and the optical force probe. These optical forces carry rich information about the sample, including its thermal properties, and also involve complex interplay among the different types of forces that are simultaneously generated by light.

A controller 150 may control the operation of the excitation light source 102 and/or the optical force detector 104. In some examples, the controller 150 may control the operation of the excitation light source 102 to generate an excitation beam that is specifically tailored to provide for a decoupling of the photothermal force from other optical forces generated in a sample 114 being measured by the decoupled optical force nanoscopy system 100. In some examples, the controller 150 may also acquire optical force data measured by the optical force detector 104, and may store those data or process them further (e.g., to generate optical force maps), as described in the present disclosure. Additionally or alternatively, a separate data acquisition system may be used to acquire data measured by the optical force detector 104.

The excitation light source 102 may be a laser light source. For example, the excitation light source 102 can generate a laser beam that is incident upon a sample 114 arranged between the excitation light source 102 and the optical force detector 104. As a non-limiting example, the laser light may be selected from a range of 600-700 nm with a 10 nm bandwidth. The excitation light source 102 may include an objective lens that focuses the excitation light on the sample 114. In some embodiments, the excitation light source 102 may be a supercontinuum laser that acts as a continuous wave (CW) source. For example, the excitation light source 102 may include a supercontinuum laser (NKT Photonics SuperK EXTREME) filtered by a tunable filter (NKT Photonics SuperK VARIA) to generate laser light with a center wavelength of 600 nm and/or 700 nm and a bandwidth of 10 nm.

As will be described in more detail, the excitation light source 102 may be temporally modulated by a modulation signal (e.g., a square wave) with a modulation frequency, $f_{opt}$, near the fundamental mechanical resonance of the optical force probe. As a non-limiting example, the modulation signal may have a frequency in the hundred-kilohertz regime. For instance, as illustrated in FIG. 1B, the excitation light source 102 may be modulated with an acousto-optic modulator (AOM) (Gooch & Housego AOMO 3080-125) controlled by a function generator (Agilent 33250A 80 MHz Function/Arbitrary Waveform Generator) with a modulation frequency between 160 kHz to 180 kHz according to the cantilever's resonance frequency used in this example.

The output laser from the excitation light source 102 can be unpolarized initially and coupled to the optical force probe system through a multi-mode optical fiber. In the illustrated example, at the output of the fiber the laser can be collimated and polarized to circularly polarized light (CPL) with a polarizing beam splitter and a quarter-wave plate.

As illustrated, the optical force detector 104 is configured as an atomic force microscope (AFM) probe. Accordingly, the optical force detector 104 may include a scanning probe with a cantilever 106 and a tip 108, a detection light source 110, and a photodetector 112. The AFM probe can be fabricated with different shapes and structures. As one example, the tip 108 can be shaped with a chiral shape to detect when circularly polarized light is used to generate the optical forces from the sample 114. In the example illustrated in FIG. 1B, the optical force detector 104 includes an AFM system (Oxford Asylum MFP3D-BIO) integrated with an inverted optical microscope (Olympus IX81) with a high NA oil immersion objective lens (Olympus PlanApo 60x). The laser from the detection light source 110 is focused on a spot with a diameter of around 50 μm. The AFM head (i.e., scanning probe tip 108) is integrated with a built-in specialized bandpass filter (Semrock FF01-835/70) that blocks the laser from going to the photodetector 112. The AFM probe of 4XC-NN is used with the standard AC mode cantilever with a resonance frequency of around 170 kHz. To extract the optical forces, the deflection signal of the cantilever is demodulated with a lock-in amplifier 118 (Signal Recovery 7280 DSP Lock-in Amplifier) with an integration time of 100 ms. The low-pass filter bandwidth is set to 10 Hz with a slope of 12 dB/Octave.

Figure 2C:
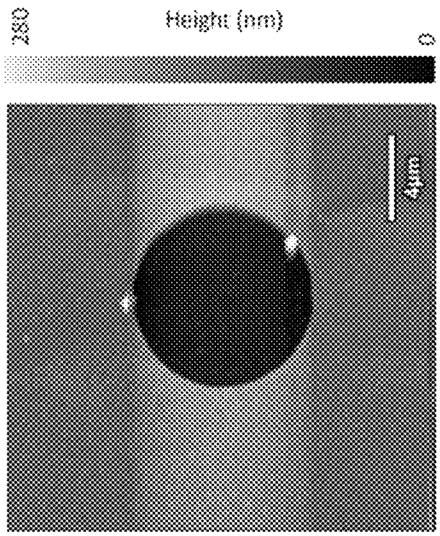
FIGS. 2A-2C illustrate an example optical window for a decoupled optical force nanoscopy system.
Figure 2B:
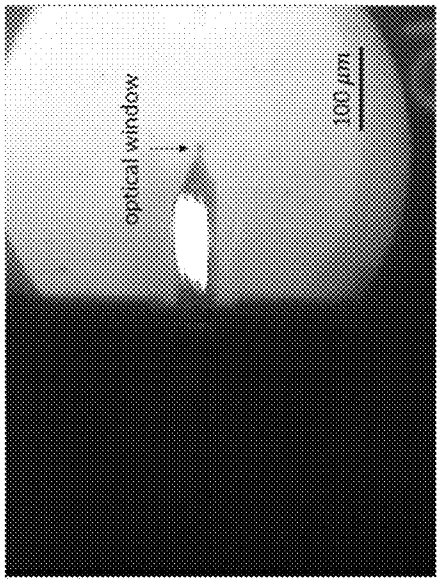
Figure 2A:
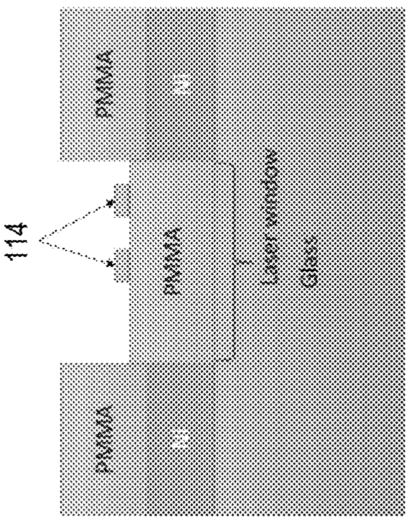

In a non-limiting example, measurements are done in a 10 μm-diameter window fabricated on a glass slide with a thickness of around 150 μm, as illustrated in FIGS. 2A-2C. The window can be covered by the AFM tip during the optical force measurements. So, the laser leakage to the photodetector is significantly reduced. The window can be fabricated with photolithography (using LOR 5B and AZ 5214 as a dual layer-photoresist), electron beam deposition of 200 nm of nickel, and lift-off. A layer of 200 nm of PMMA is spin coated and cured to the glass slide. The sample (e.g., gold nanorods) can be placed on the glass slide through drop casting, nanofabrication, or other methods, as shown in FIG. 2A. The optical force is scanned inside the optical window and with the laser aligned to the AFM tip.

Figure 3:
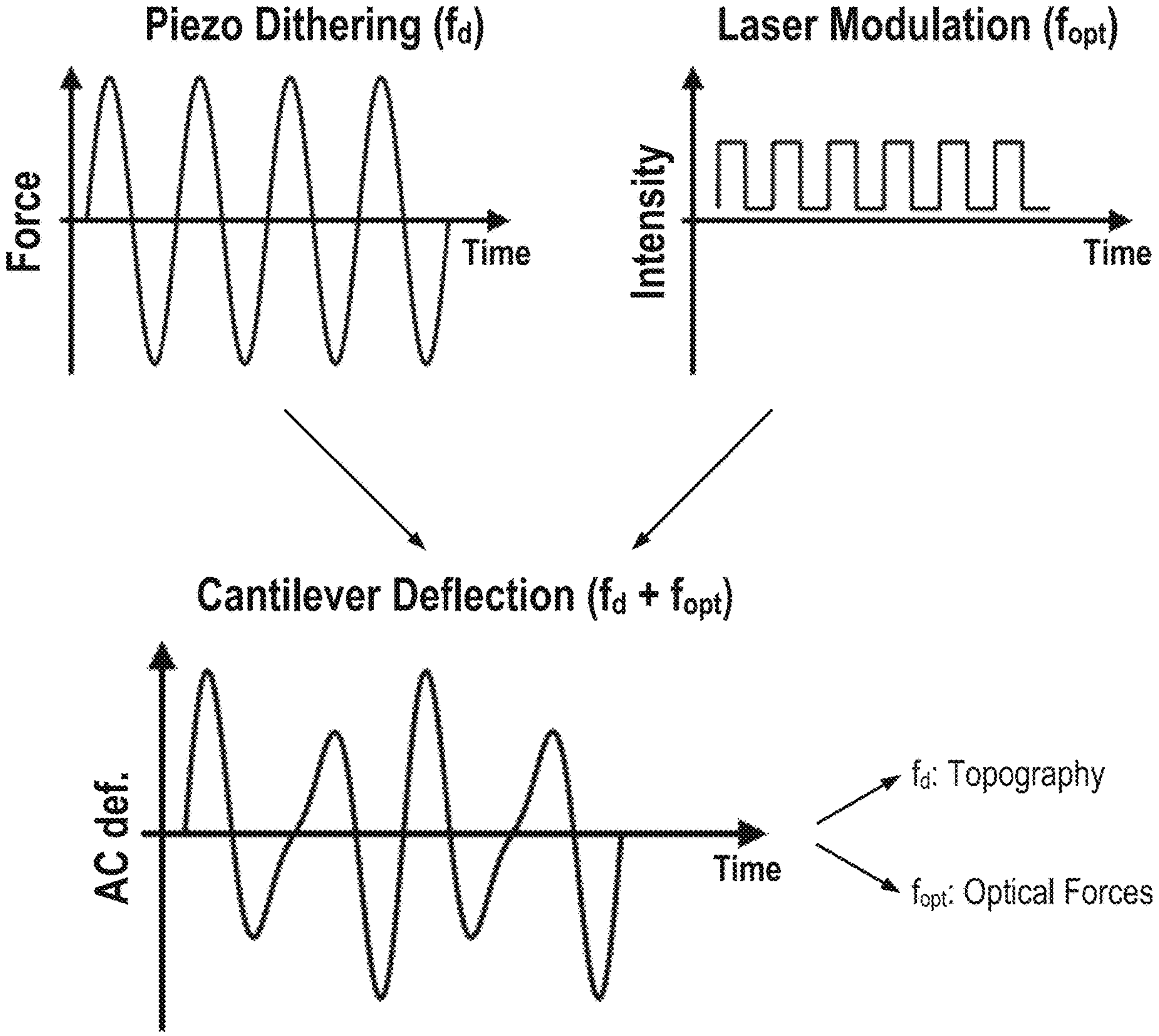
FIG. 3 illustrates modulating both a vibrating piezoelectric actuator of a scanning probe microscope and the excitation laser light, such that both topography and optical force data can be acquired.

In some examples, a vibrating piezoelectric actuator 116 may be coupled to the cantilever 106 to provide mechanical vibration of the cantilever 106, which can be used to help measure the topography of the sample 114 in addition to the optical forces generated by the excitation beam. As one example, the vibrating piezoelectric actuator 116 can be vibrated according to a sinusoidal function to shake the cantilever 106 with the frequency of the sinusoidal function. The vibrating piezoelectric actuator 116 on the optical force probe 104 mechanically dithers the cantilever 106 at a slightly different frequency, $f_d$, than the modulation signal frequency, $f_{opt}$. As the optical forces and the mechanical dithering force from the vibrating piezoelectric actuator 116 vibrate the optical force probe 104 at different frequencies, the deflection signal from the cantilever 106 recorded by the photodetector 112 contains both frequency components. The vibration at $f_d$ indicates the topography of the sample, and the vibration at $f_{opt}$ indicates the optical forces from the sample upon illumination. The optical forces can be extracted with a lock-in amplifier 118 with a corresponding reference frequency of $f_{opt}$. For example, the lock-in amplifier 118 may be used to demodulate the deflection signals measured by the optical force probe 104 with the reference frequency, $f_{opt}$. FIG. 3 illustrates an example of the modulation signal of the vibrating piezoelectric actuator, the excitation light source and the resulting cantilever deflection in the time domain. In the illustrated example, the vibrating piezoelectric actuator is driven by a sinusoidal wave with the frequency of $f_d$ and the excitation light source is modulated by a square wave with the frequency of $f_{opt}$. The deflection signal at $f_d$ contains topographic information and at $f_{opt}$ contains the optical force information.

In use, light is transmitted from the excitation light source 102 onto the sample 114. As the incident light interacts with the sample it generates a force that can be measured by the optical force detector 104. For instance, the optical forces generated by exciting the sample with light from the excitation light source 102 can be measured by measuring the deflection of the cantilever 106 as its tip 108 is moved over the sample 114. The deflection of the cantilever 106 may be measured by transmitting light from the detection light source 110 onto the cantilever 106 and measuring light reflected from the cantilever 106 with the photodetector 112.

As the cantilever 106 is deflected by the optical forces from the sample 114, the light incident on the photodetector 110 will be modulated according to the deflection of the cantilever 106. The optical force can be directly measured from the data acquired by the photodetector 110, which may be measured using a lock-in amplifier 118 or the like. For example, to extract the optical forces, the deflection signal of the cantilever can be demodulated with the lock-in amplifier 118 (Signal Recovery 7280 DSP Lock-in Amplifier) with an integration time of 100 ms; the low-pass filter bandwidth can be set to 10 Hz with a slope of 12 dB/Octave. A spectrum of the force may also be mapped out. The spectrum of the force will, in general, be centralized, or otherwise around, the resonance spectrum of the sample 114.

As described above, a conventional optical force microscope will measure the overall optical force, which includes multiple different components. For instance, the overall optical force is related to the optical properties of the particle being measured and other factors including thermal properties, acoustic properties of the environment, and structure information. As one example, optical gradient forces may be present in the measured optical force data near plasmonic nanoparticles due to the enhanced field gradient generated near the sample 114. Photoacoustic forces may also be present in the measured optical force data because as particles are getting heated up and then cooled down, the resulting expansion/contraction can generate acoustic signals that get captured by the cantilever 106. All of these forces can be generated by exciting the sample 114 using the excitation light source 102.

It is an advantage of the present disclosure that the decoupled optical force nanoscopy system 100 can be configured and operated such that the measured optical forces can be decoupled from each other, such that a measurement of photothermal forces can be made separate from other optical forces, such as optical gradient forces, photoacoustic forces, and the like. In general, the controller 150 controls the operation of the excitation light source 102 to modulate the excitation beam such that the various optical forces can be delineated in the frequency domain.

Figure 4A:
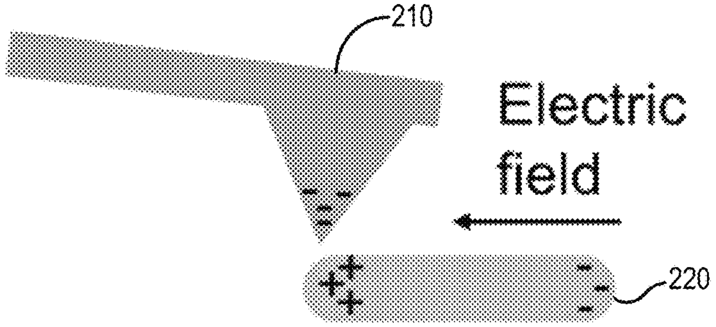
FIGS. 4A-4C illustrate the origins of different optical force components, including optical gradient force (FIG. 4A), photothermal force (FIG. 4B), and photoacoustic force (FIG. 4C).

As illustrated in FIG. 4A, the optical gradient force from a plasmonic nanoparticle arises from an electric field that polarizes the particle 210 and the probe 220. The resulting interaction between the particle 210 and probe 220 generates the optical gradient force. The optical gradient force, $F_G$, is associated with the electric polarizabilities of the AFM probe, $\alpha_{tip}$, as well as the electric field intensity in the z-direction at the AFM tip location, $E_z$:

$$F_G \propto \alpha_{tip} \nabla E_z^2.$$

Figure 4B:
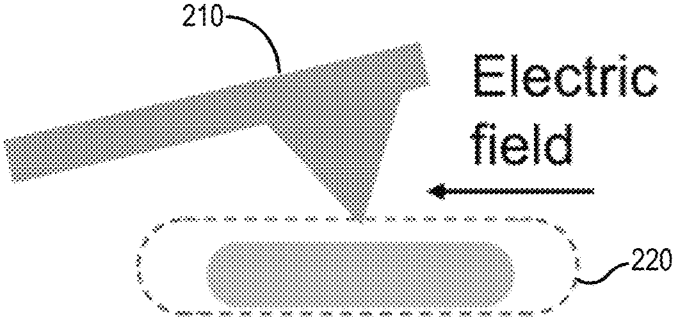

As illustrated in FIG. 4B, the photothermal force arises from the surface expansion of the particle 210, which is enhanced when the probe 220 is in contact, or essentially in contact, with the particle 210. The photothermal force, $F_{PT}$, is proportional to the overall thermal expansion of the particle 210 (e.g., a gold nanorod as an example) and the AFM probe around the nanoparticle-tip interface:

$$F_{PT} \propto \int_{probe} dz \beta \Delta T;$$

where β is the thermal expansion coefficient, and ΔT denotes the elevated temperature of each domain, including the nanoparticle and its surrounding media with an assumption that only the nanoparticle absorbs optically.

Figure 4C:
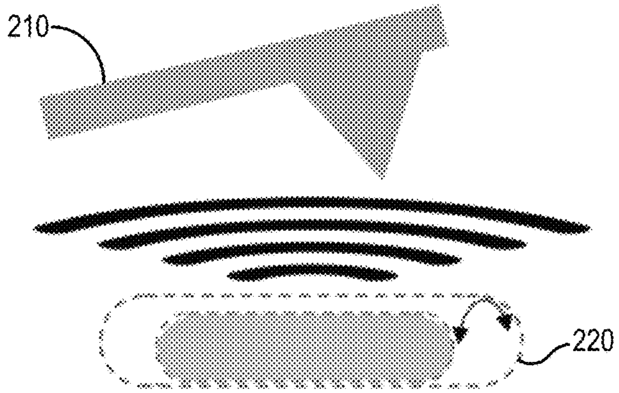

As illustrated in FIG. 4C, the photoacoustic force is generated by the heating up and cooling down of the particle 210 during this cycle of a modulation. When the nanoparticle is illuminated at its plasmonic resonance, it also generates a photoacoustic signal with the modulation frequency of the laser, $f_{opt}$. The acoustic pressure is proportional to the second time derivative of the photothermal expansion:

$$F_{PA} \propto \int_{probe} ds \beta \frac{d^2 T}{dt^2}.$$

The photoacoustic pressure will be exerted on the entire probe (i.e., cantilever and tip) instead of a localized spot near the tip, resulting in a non-localized photoacoustic force, which can be treated as a uniform background.

Figure 5A:
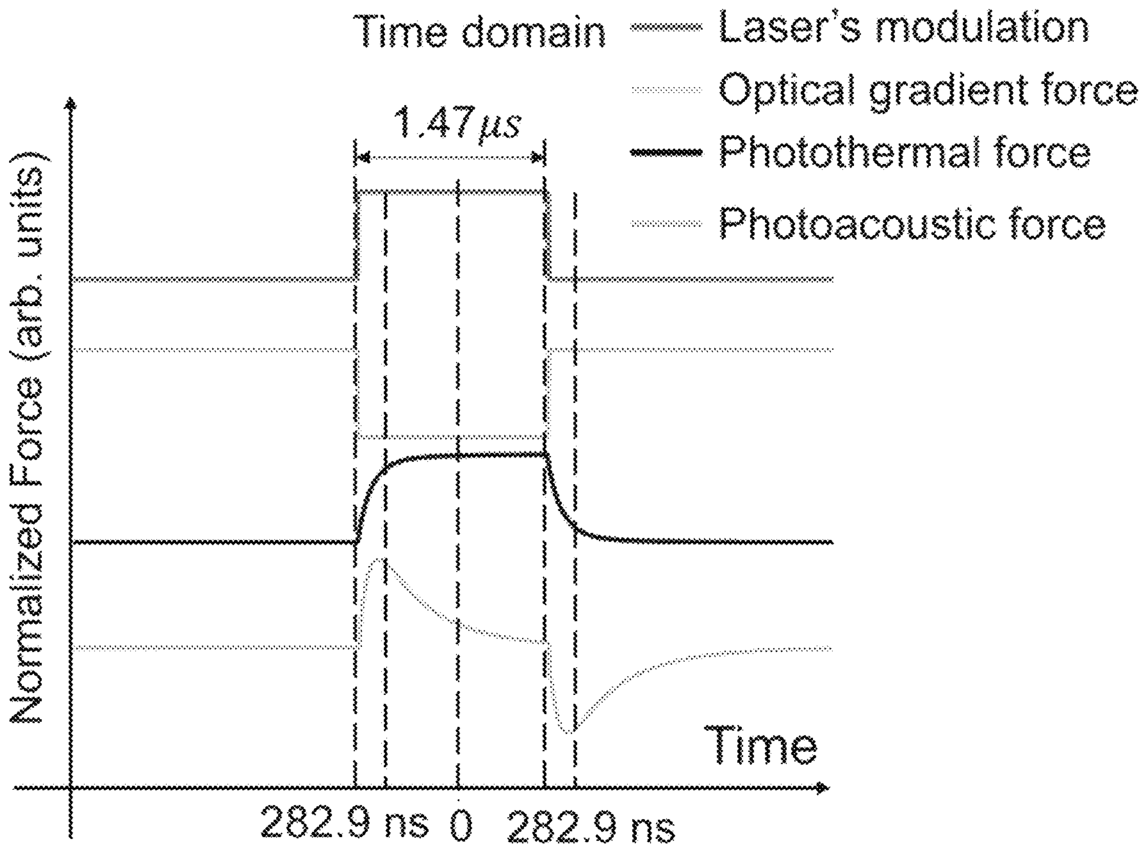
FIGS. 5A and 5B illustrate how temporally modulating an excitation laser light affects the phase distribution of the different force measurements in the frequency domain. Simulated optical forces from a nanorod on PMMA substrate measured by an AFM probe in the time domain and illustrated corresponding optical forces in the frequency domain, showing distinct phase distributions of the optical gradient force ($F_G$, cyan), photothermal force ($F_{PT}$, black), and photoacoustic force ($F_{PA}$, orange). In the time domain, the optical gradient force simultaneously responds to the laser excitation and follows the temporal modulation (magenta). The photothermal force has around 283 ns delay to reach 90% of its stationary intensity. The photoacoustic force only happens at the rising and falling edges and has a full width at half maximum of around 471 ns.
Figure 5B:
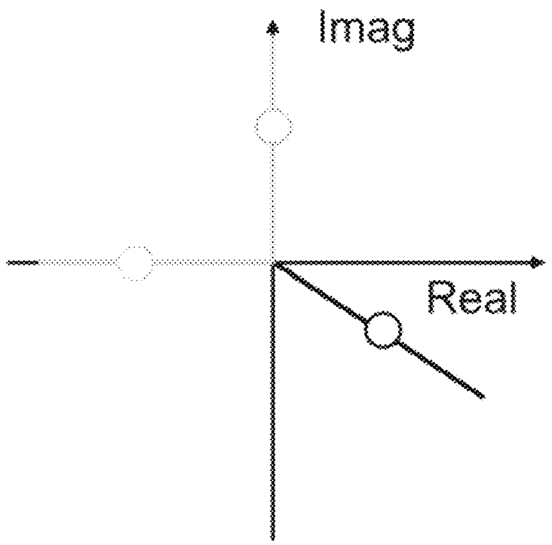

To delineate these forces, the excitation light source 102 can be modulated. As a non-limiting example, the excitation light source 102 can be modulated in the time domain using a square-wave function, although in other examples different modulation functions may also be used. FIGS. 5A-5B illustrate an example of modulating the excitation beam using a square wave with a frequency of about 170 kilohertz, which is near the mechanical frequency of the cantilever used in this example.

As shown in FIG. 5A, when the sample is excited using an excitation beam that has been modulated using a square wave, the optical gradient force responds immediately (e.g., within a femtosecond of the excitation). The optical gradient force presents as another square wave. In the frequency domain, the optical gradient force, being represented by an even function (i.e., a square wave) will sit on the x-axis (i.e., the real axis in the frequency domain, as shown in FIG. 5B). The optical gradient force is an attractive force proportional to the modulation waveform because it is generated by the electric field gradient near the nanoparticle (e.g., a gold nanorod).

As illustrated in FIG. 5A, the photothermal force takes time to heat up and cool down, so the photothermal force will have a heating time and a cooling time. The photothermal force response can be modeled, however, as a square wave with two pulses or two delta functions superimposed together. In this way, the photothermal force response can be modeled as an even function superimposed with an odd function. Accordingly, in the frequency domain, the photothermal force will have both a real component and an imaginary component; that is, the photothermal force will sit in the complex domain as shown in FIG. 5B.

As also illustrated in FIG. 5A, the photoacoustic force comes from the time derivative of the photothermal effect (e.g., the temperature gradient caused by the excitation of the particle). As a result, the photoacoustic force can be modeled as the temperature derivative of time, which results in two pulses. The heating up time of the photoacoustic force is on the order of hundreds of nanoseconds, but the range of the pulse is on the order of microseconds. Because the duration of the force is much longer than the heating up and cooling down times, the photoacoustic force may be modeled as an odd function. In the frequency domain, the photoacoustic force will sit along the imaginary axis, as illustrated in FIG. 5B.

These distinguishable temporal responses lead to different phases of the optical forces. The optical gradient force is an even symmetric function with respect to the center of the modulation period, and therefore, falls on the real axis in the frequency domain. The photothermal force has both even and odd symmetric components, and therefore, is a complex value in the frequency domain. The photoacoustic force is an odd symmetric function in the time domain, and thus, falls on the imaginary axis in the frequency domain. Based on these known distributions in the frequency domain, the different origins of optical forces can be distinguished using their unique phases.

Thus, by modulating the excitation light source 102 with a square-wave function (or other suitable even function), the phases of the resulting optical forces will be differently distributed in the frequency domain, such that they can be separately delineated.

As described above, in some examples a vibrating piezoelectric actuator 116 can be coupled to the cantilever 106 and used to vibrate the cantilever 106 at a frequency, which can be selected to be a different frequency than the laser modulation frequency. As the cantilever 106 is moved over the surface of the sample 114 the topography of the sample 114 can be measured. The measured deflection is a one-dimensional signal that has a mix of the laser modulation and piezo modulation frequencies, as illustrated in FIG. 3. Thus, by using the piezo modulation, both topography data and optical force data can be acquired. By analyzing the acquired data at the piezo modulation frequency, the topography of the sample 114 can be analyzed, whereas by analyzing the acquired data at the laser modulation frequency, the amplitude and the phase of the optical forces can be analyzed.

It is a challenge of conventional scanning probe techniques to capture the temporal dynamics of the photothermal process because, intuitively, the mechanical oscillation and the scanning speed of a probe are much slower than the photothermal dynamics, which is in the nanosecond to microsecond regime depending on the substrate. To address this challenge, the systems and methods described in the present disclosure utilize the property that the photothermal force is amplified when the AFM tip is in close contact with the sample.

The photothermal expansion, $B=\beta\Delta T$, drives a periodic deflection signal at $f_{opt}$. The oscillation of the photothermal expansion results in a time-varying spring constant $k_{PT}$ (t), which is stronger when the tip is in contact with the sample and vice versa. The probed photothermal force is proportional to this spring constant, $$F_{PT} \propto \langle e^{i\omega_{opt}t} \,|\, k_{PT}(t)B(t) \rangle.$$

Figures 6A, 6B, 6C, 6D, 6E, 6F, 6G:
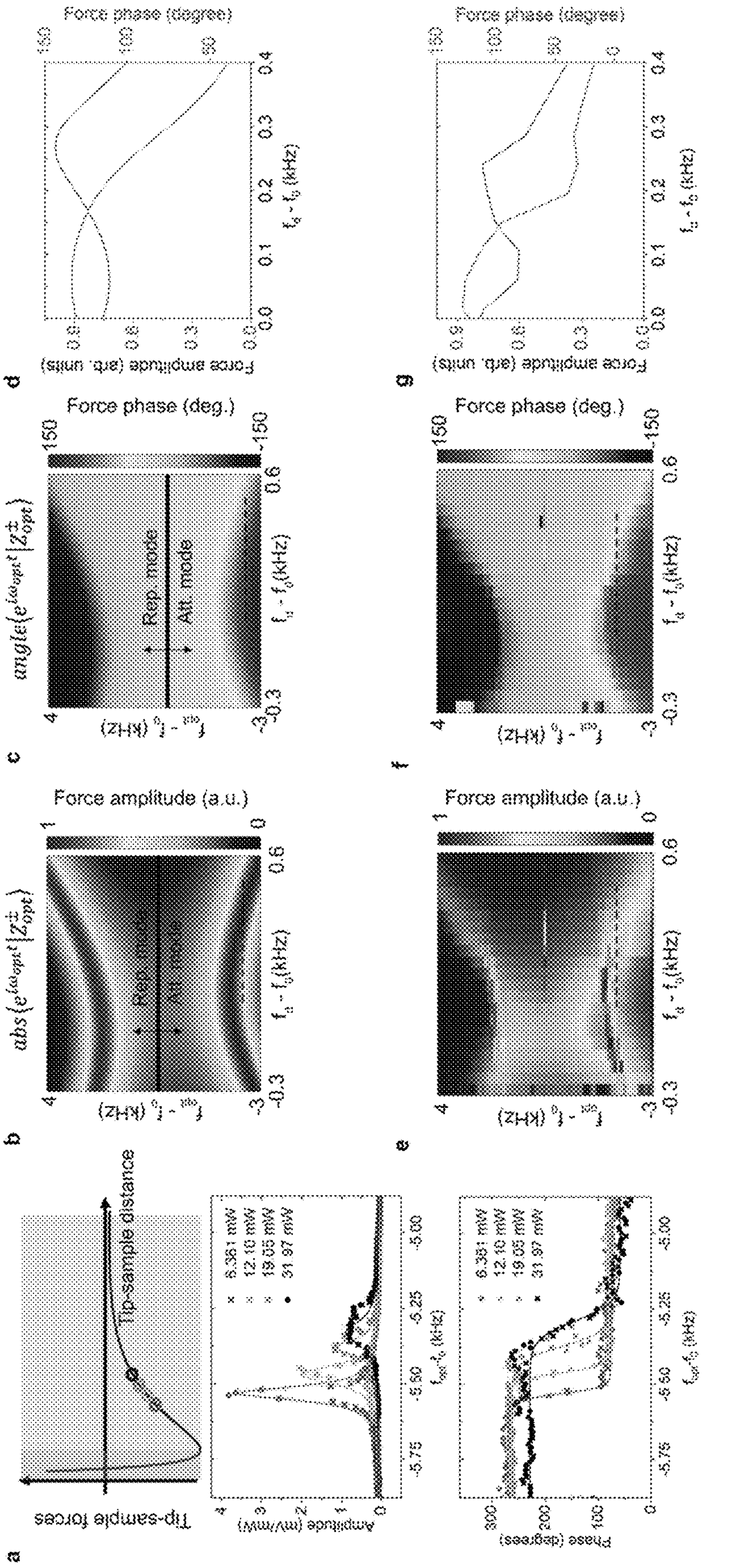
FIGS. 6A-6G illustrate examples of time-selective photothermal measurements.

The oscillation of the spring constant results in a distinct response of different time frames within a period. The time frame when the tip is in close contact with the sample is selectively enhanced. This phenomenon is known as the back-action of the photothermal expansion. As shown in FIG. 6A, the tuning curve of the cantilever shifts at different laser intensities. The tip-sample interaction is modulated by the laser's intensity and oscillates at $f_{opt}$ with a phase shift of $\phi_{PT}$ to the photothermal expansion. The cantilever shows a higher response to the time frame in a modulation period when it has a higher tip-sample interaction. Therefore, the detected photothermal expansion is locked at a certain time frame within a period. The probed time frame can be tuned by the phase shifts between the photothermal expansion and the tip-sample interaction. The decoupled optical force nanoscopy system can be modeled with the following time-domain equation:

$$m\ddot{z} + m\gamma\dot{z} + kz = F_d + F_{opt} + F_{int};$$

where m is the effective mass of the probe; z is the deflection of the cantilever; $\gamma$ is the damping coefficient, which comes from the viscosity of the sample and the air resistance to the probe and is assumed to be a constant; k is the spring constant of the probe; $F_d$ is the dithering force of the piezo, which has a frequency dependence of $\omega_d=2\pi f_d$; $F_{opt}$ denotes the overall optical forces; and $F_{int}$ describes the tip-sample interaction force that occurs when the tip engages to the surface when the tip is oscillating. Here, a linear tip-sample force, $F_{int}=-k_{sp}z$, is assumed, where $k_{sp}$ describes an effective spring constant in addition to the free air spring constant of the probe, and it is determined by the engagement factor $\xi$. When solving this time-domain equation for the cantilever deflection, it has two solutions at the optical modulation frequency one corresponds to the attractive mode and the other corresponds to the repulsive mode:

$$\langle e^{i\omega_{opt}t} \mid Z^{\pm}_{opt}\rangle = \frac{F_{opt}}{-m\omega_{opt}^2 + im\gamma\omega_{opt} + m\omega_d^2 \pm \frac{1}{\xi}\sqrt{(k - m\omega_d^2)^2 + (1-\xi^2)(m\gamma\omega_d)^2}}$$

where $e^{i\omega_{opt}t}$ is the unit sinusoidal oscillation of the cantilever driven by the optical force;

$$Z^{\pm}_{opt}$$

is the mode of the tip-sample interaction (repulsive mode or attractive mode); $\omega_{opt}$ is the optical modulation frequency (i.e., the laser modulation frequency); $\omega_d$ is the piezo modulation frequency, which may be referred to as the dithering frequency; m is the effective mass of the cantilever; $\gamma$ is a damping parameter, which can be measured; $\xi$ is the engagement factor of the AFM probe, which represents how much the oscillation amplitude attenuates with the probe being engaged; k is the spring constant of the cantilever 106, which can be measured; and $F_{opt}$ is the measured optical force.

In the frequency domain, the photothermal force will have different phases corresponding to different time frames. To measure photothermal dynamics, the phase of the photothermal force can be moved around to capture different time frames of the photothermal effect. As one example, this can be achieved using the mode of the cantilever 106.

The equation of motion can be used to determine the amplitude and phase of the two modes of the cantilever 106. For instance, by calibrating components of the equation, it can be solved to calculate two modes: a positive (attractive) mode and a negative (repulsive) mode. Following calibration, the equation of motion for the cantilever is a function of the dithering frequency and the optical modulation frequency. In this way, the optical force detection system 104 can be calibrated to know where the modes of the cantilever 106 are located.

As an example, the optical modulation frequency may be fixed, and the dithering frequency may be selected from a range. When the dithering frequency is moved, the phase of the measured optical forces will be shifted (e.g., from 0 to 180 degrees). How accurately the phase is shifted corresponds to how accurately the optical forces can be measured in time.

In an example experiment, a 60% amplitude was used as the setpoint of the engagement, corresponding to an engagement factor $\xi$ of 0.6. The probe used in this example experiment had a mechanical resonance frequency of 174.1 kHz, a spring constant of 8.6 N/m, and a damping coefficient of $5.65\times10^3$ $s^{-1}$, which are measured quantities. In repulsive or attractive modes, the theoretical frequency-dependent map of the amplitude and phase of the optical forces were plotted as a function of the relative frequency with respect to the cantilever mechanical resonance, as shown in FIGS. 6B-6D. As each AFM probe has a slightly different fundamental mechanical resonance, $f_0$, relative frequencies can be used with respect to the mechanical resonance to calibrate the system. The two modes are observed experimentally (FIGS. 6E-6G), which corroborates the proposed theory. As the attractive mode is in a lower energy state, a stronger signal intensity can be observed; therefore, optical forces can be advantageously measured in this mode.

The probed time frame can be tuned by the phase of the cantilever deflection, $\phi$, as, $$t_{probe} = t_0 + \frac{\phi}{f_{opt}};$$

where $t_0$ is a constant given by the initial condition. The phase $\phi$ is dependent on both the optical modulation frequency and the piezo's dithering frequency (FIG. 6C, 6F). The optical modulation frequency can be fixed close to the upper edge of the $$|Z^{-}_{opt}\rangle$$

mode to ensure a relatively large signal-to-noise ratio (SNR) and a close-to-constant amplitude. By varying the piezo's dithering frequency, as shown in the dashed lines in FIGS. 6D and 6E, the phase response of the probe at $f_{opt}$ can be tuned. In a non-limiting example, the relative optical modulation frequency can be fixed at −1.38 kHz on the attractive mode branch and the relative piezo's dithering frequency can be altered from −0.75 kHz to 0.75 kHz, which corresponds to tuning the phase from around 0 to around 150 degrees as indicated by the dashed line in FIG. 6F.

By varying the piezo's dithering frequency, the phase of the cantilever's deflection can be tuned with respect to the laser's modulation, and therefore, the heating and cooling stages of a single nanorod can be observed within one modulation period. The temporal resolution of the measurement is associated with the phase tuning resolution. Based on the phase jittering limited by the fluctuation of the AFM system, the temporal resolution is estimated to be 32.7 ns.

FIGS. 7A-7K show an example of imaging photothermal force dynamics using the systems and methods described in the present disclosure. In this example, a gold nanoparticle is shown as being used for tissue or biomedical applications. A PMMA substrate was used given its advantage of a higher heat capacitance and lower thermal conductivity than a glass substrate to better mimic the heat transfer of nanoparticles inside adipose tissue. The low thermal conductivity also prolongs the heat transfer process. Decoupled optical force nanoscopy is used to monitor the photothermal forces in the gold nanoparticle as it is heated up and allowed to cool down, and these results are compared with theoretical simulations. At a time $t_1$, the nanoparticle is heated. The nanoparticle then begins to heat up its surrounding environment, as seen at times $t_2$ and $t_3$. The nanoparticle then cools down, as seen at time $t_4$, but the surrounding environment is still heated at this point. Finally, at a time $t_5$ both the environment and the nanoparticle have cooled down.

Figures 7A, 7B, 7C, 7D, 7E, 7F, 7G, 7H, 7I, 7J, 7K:
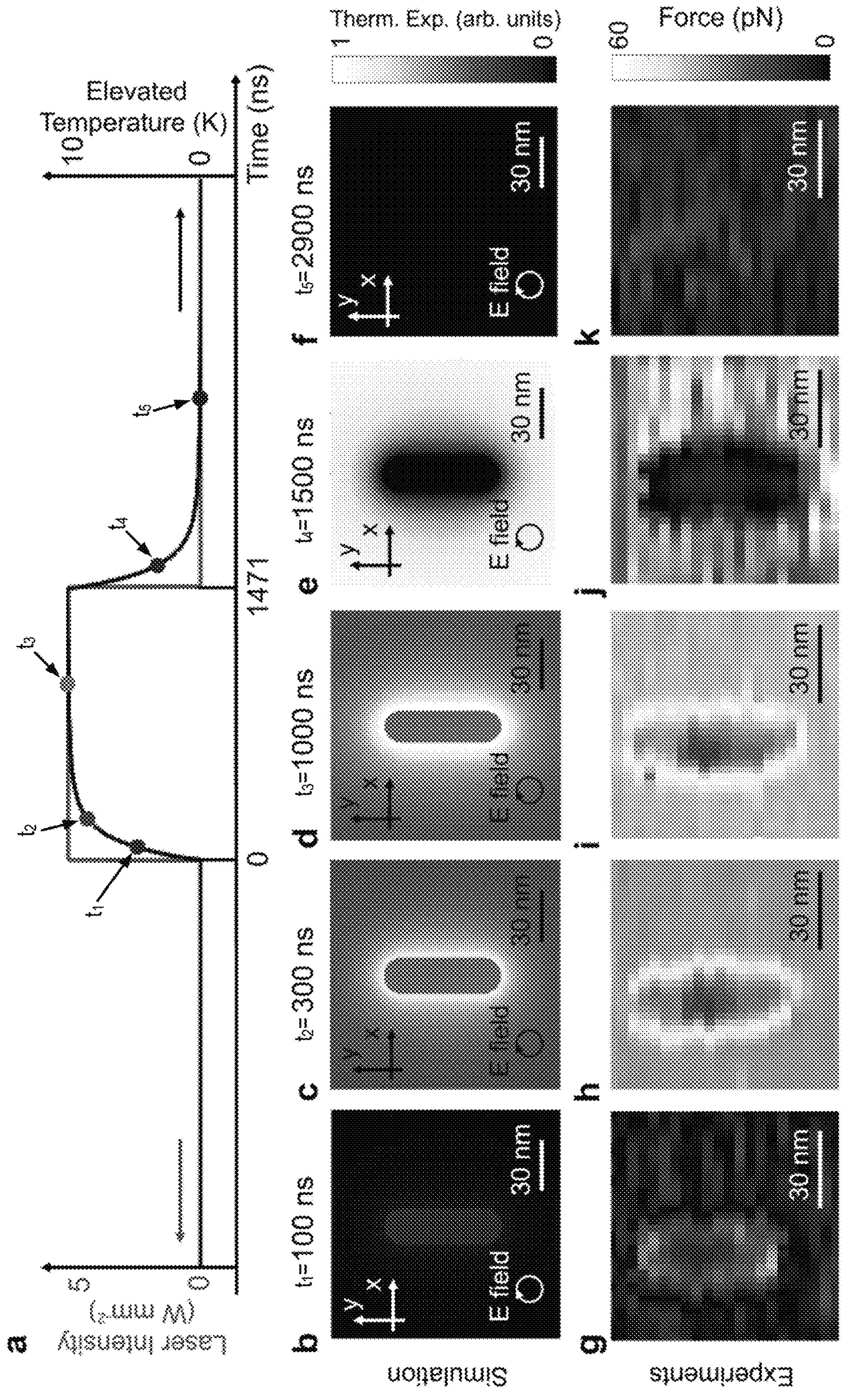
FIGS. 7A-7K illustrate an example of the photothermal force maps showing the temporal evolution of a nanoscale thermal profile.

As shown in FIG. 7A, the thermal relaxation time is 282.9 ns, thus, the heating and the cooling processes take a significant proportion (around 38%) of the modulation period. The process of heat conduction is non-stationary. As shown in the theoretical calculation (FIGS. 7B-7F), the nanorod, which resonantly absorbs photon energy and generates heat, is the first region to heat up. As the thermal gradient forms between the nanorod and the surrounding media, heat diffuses out and heats up the surrounding region of PMMA in 282.9 ns, which is the nanoscopic expression of the thermal non-confinement. As the gold nanorod has a better thermal conductance to the AFM tip compared to PMMA, the equilibrium thermal expansion of the surrounding PMMA is higher than the gold nanorod (FIG. 7C, 7D). Similarly, during the cooling phase, the nanorod will first cool down due to the high thermal conductance to the AFM tip (FIG. 7E) and followed by the surrounding media (FIG. 7F). The measured time dynamics of the photothermal force maps in FIGS. 7G-7K match well with the theoretical predictions (FIGS. 7B-7F).

Figures 8A, 8B, 8C, 8D, 8E, 8F, 8G, 8H, 8I, 8J, 8K:
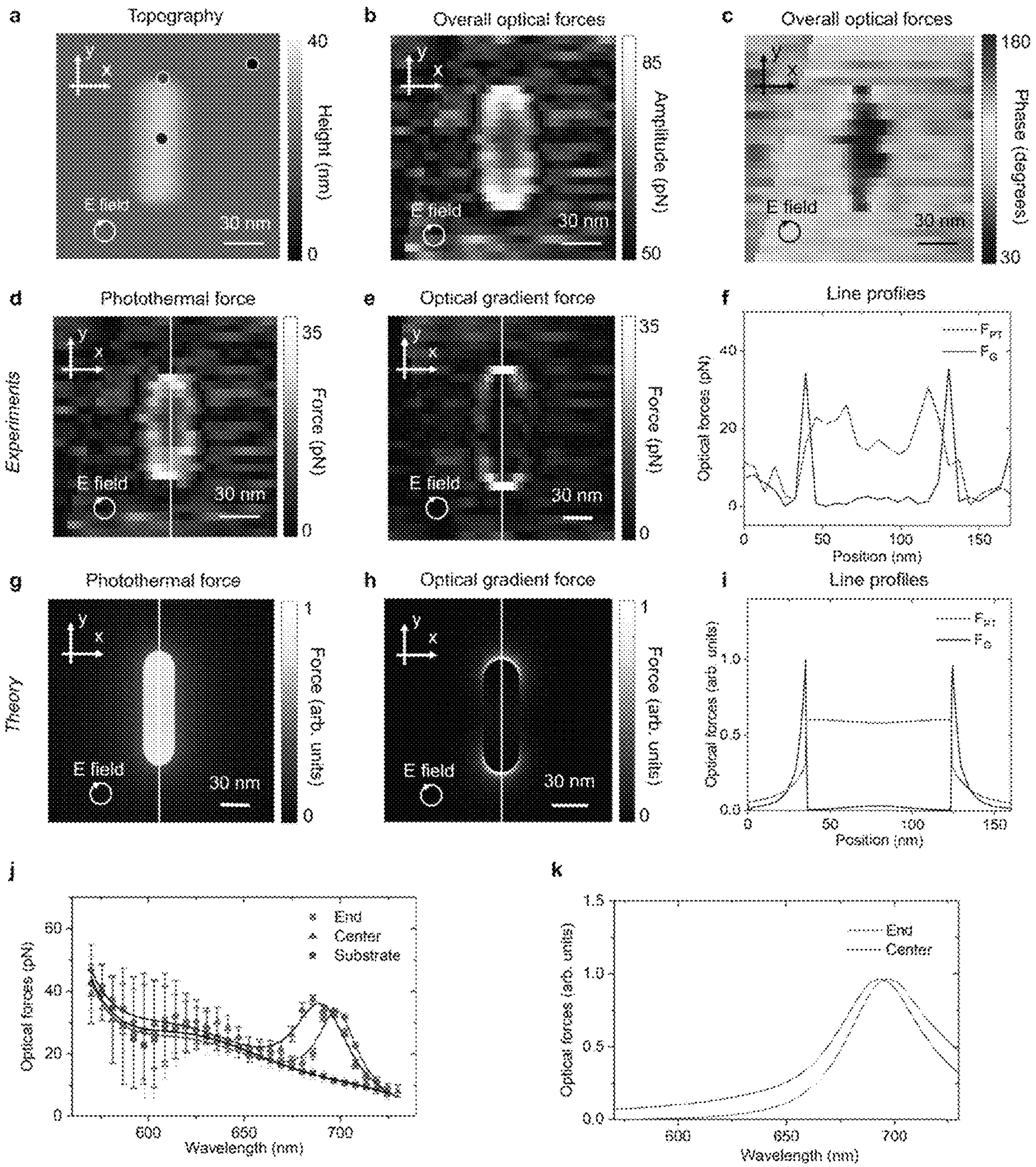
FIGS. 8A-8K illustrate examples of topography maps, optical force amplitude maps, optical force phase maps, and photoacoustic, optical gradient, and photothermal force maps extracted therefrom.

As an example, a gold nanorod was imaged using a decoupled optical force nanoscopy as described in the present disclosure. The resulting topography and optical force maps are illustrated in FIGS. 8A-8K. The measured topography (FIG. 8A) and the complex optical forces (both amplitude and phase in FIGS. 8B and 8C, respectively) of a gold nanorod through a single scan are shown. The three types of optical forces have not only distinct phases, but also different spatial distributions. FIG. 8C shows the highly structured phase distributions of the optical forces. In particular, the phase is close to −180 degrees around the two ends of the nanorod, which suggests that the optical gradient effect dominates at the ends of the nanorods. The phase is between 0 and 90 degrees over the body of the nanorod, suggesting that the photothermal effect dominates in that region. In contrast, the phase is close to 90 degrees in most of the background region, which corroborates that the non-localized photoacoustic effect dominates the background signal but contributes minimally to the structured distribution around the gold nanorod.

The amplitude distribution of the optical forces can be defined as $F_{opt}(\vec{r})$ and phase as $\phi_{opt}(\vec{r})$. To delineate these optical forces, the non-localized photoacoustic force $F_{PA}$ and its phase $\phi_{PA}$ are subtracted in the field of view based on the background signal outside the nanorod. The background can generally be assumed to be mainly from the photoacoustic force, and thus it has a phase of 90 degrees. The phase of the photothermal force $\phi_{PT}$ can be determined from the region with a low contribution of the optical gradient force (e.g., the center of the nanorod). When the photoacoustic force is removed from the overall optical forces, the photothermal force is the only one that contributes to the imaginary component of the remaining optical forces, $(F_{opt}(\vec{r})-F_{PA})\sin(\phi_{opt}(\vec{r})-\phi_{PA}+\pi/2)$. Thus, the photothermal force can be calculated as, $$F_{PT}(\vec{r}) = \frac{(F_{opt}(\vec{r}) - F_{PA})\sin(\phi_{opt}(\vec{r}) - \phi_{PA} + \pi/2)}{\sin(\phi_{PT})}.$$

The optical gradient force is assumed to have only a real component and can therefore be decoupled by subtracting the real component of the photothermal force, $$F_G(\vec{r}) = (F_{opt}(\vec{r}) - F_{PA})\cos(\phi_{opt}(\vec{r}) - \phi_{PA} + \pi) - F_{PT}(\vec{r})\cos(\phi_{PT}).$$

The maps of the photothermal force and the optical gradient force are shown in FIGS. 8D-8F and confirmed by the simulated force maps in FIG. 8G-8I Using the same procedure, the optical gradient forces with different circular polarizations at various wavelengths can be decoupled, showing the distinct force distributions around the nanorod that corroborate with electromagnetic simulations. The spectrum of the optical force at different probing locations is shown in FIG. 8J and fits well with the simulation shown in FIG. 8K. The plasmonic resonance around the wavelength of 700 nm was observed as expected, which matches the resonance of the photothermal force and the optical gradient force. The resonance peak measured at the end of the nanorod is red shifted by around 10 nm from that of the optical gradient force measured at the center of the nanorod. This shift may be attributed to the near-field coupling between the AFM probe and the nanorod.

As noted above, if the excitation light source 102 is a polarized light source, then differently polarizing the excitation light beam will result in discernable changes in the optical gradient force. However, because the photothermal force is caused by the heating up and cooling down of the sample, polarizing the excitation light source 102 should not affect the photothermal force.

As an example, if the excitation beam is circularly polarized light, and if the gold nanorod resonates at about 700 nanometers, no distribution for the optical gradient force will be observed with left-handed or right-handed circularly polarized light. However, the twist of these distributions will be observable when the nanorod is off-resonant since the transverse resonance will contribute to the optical gradient forces.

Figure 9:
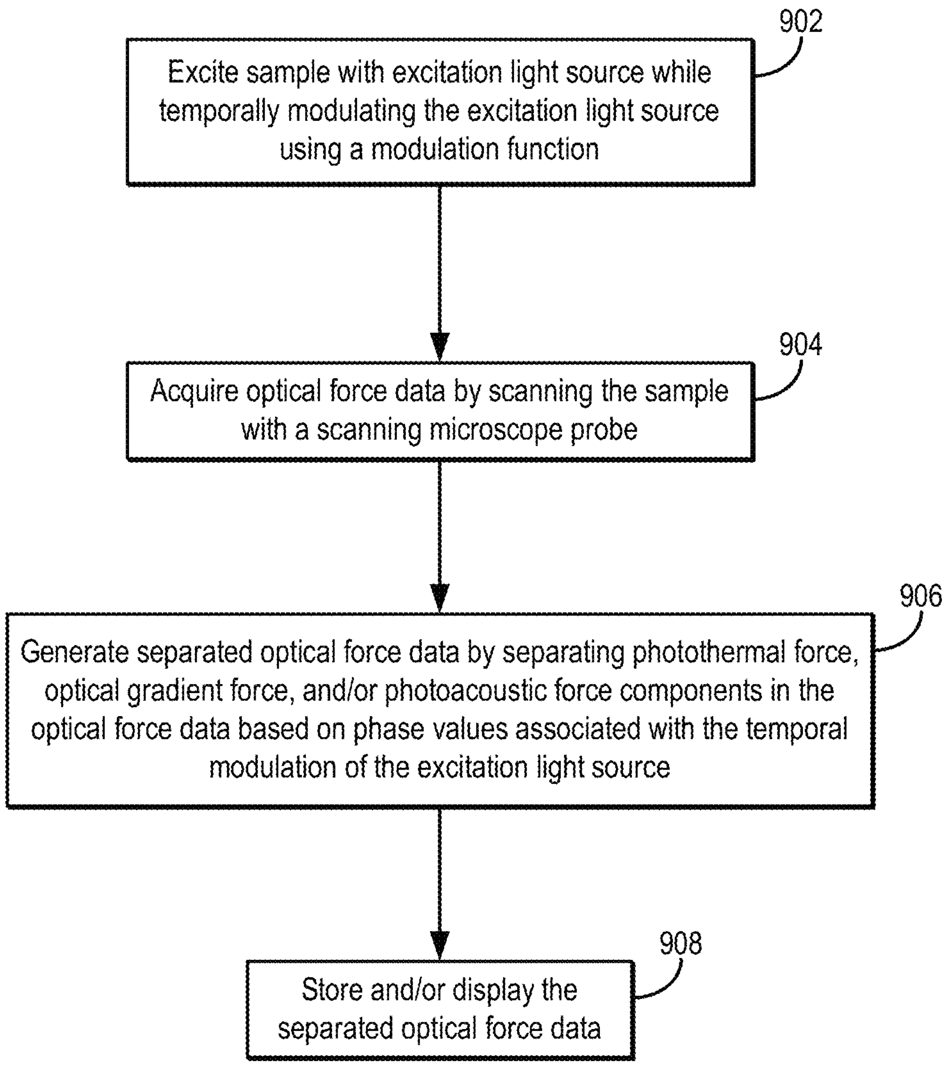
FIG. 9 is a flowchart setting forth the steps of an example method for decoupled optical force nanoscopy.

Referring now to FIG. 9, a flowchart is illustrated, which sets forth the steps of an example method for decoupled optical force nanoscopy.

The method includes illuminating a sample with an excitation light source, as indicated in step 802. As described above, the excitation light source is modulated in time with a modulation function, which may be an even function such as a square wave function. The excitation light source may be modulated with an optical force modulation frequency. As an example, light is focused on a sample with an objective lens. In some implementations, the light may be circularly polarized light.

Optical force measurement data are acquired by scanning the sample with a scanning probe microscope, as indicated in step 804. For instance, the scanning probe microscope may be an AFM probe including a cantilever having a vibrating piezoelectric actuator coupled thereto. The vibrating piezoelectric actuator can be modulated with a sinusoidal function having a frequency referred to as a piezo's dithering frequency.

Based on the temporal modulation of the excitation light source, the acquired optical force data can be separable into different force components based on the measured phase using a computer system (e.g., the controller 150 or another computer system). Thus, the method includes generating separated optical force data in step 806, which may include photothermal force data, optical gradient force data, and/or photoacoustic force data. As an example, the deflection of the cantilever containing the optical force information can be demodulated by a lock-in amplifier with a reference frequency of $f_{opt}$ (i.e., the optical modulation frequency). A 2D frequency scan (both $f_d$ and $f_{opt}$) can be measured to locate the optical modulation frequency $f_{opt}$ and the scanning range of the piezo's dithering frequency $f_d$ that maximize the amplitude. The sensitivity of the optical force measurement can range from 0.5 pN to 10 pN depending on the difference between $f_{opt}$ and $f_d$. A smaller difference leads to a higher sideband leakage of the cantilever's deflection at $f_d$ to the lock-in frequency of $f_{opt}$, and therefore, reduces the sensitivity of the optical force measurement. The lock-in amplifier can utilize a reference frequency the same as the fundamental harmonic of the square wave, therefore, excluding the potential high-order harmonics. To measure the 2D optical force map of the sample, both amplitude and phase from the lock-in amplifier are recorded. For example, the amplitude and phase can be continuously recorded with a sampling frequency of 20 Hz and a scan frequency of 10 Hz. The 1D data can then be mapped to a 2D map with a known scanning line number.

The separated optical force data can then be stored for later use and/or displayed to a user. For instance, different optical force maps (e.g., a photothermal force map, an optical gradient force map) can be generated and presented to a user, such as via a display of the computer system.

The present disclosure has described one or more preferred embodiments, and it should be appreciated that many equivalents, alternatives, variations, and modifications, aside from those expressly stated, are possible and within the scope of the invention.

The invention claimed is:

1. A method for optical force nanoscopy, comprising:

(a) exciting a sample with an excitation light source modulated in the time domain;

(b) generating optical force data by measuring, by a scanning probe microscope, optical forces from the sample generated by exciting the sample with the excitation light source;

(c) generating photothermal force data by processing the optical force data with a computer system to separate photothermal force measurements from measurements of other optical force components based on a phase distribution of the optical force data; and (d) storing the photothermal force data with the computer system.

2. The method of claim 1, wherein generating the photothermal force data comprises isolating the photothermal force measurements as those optical force measurements having phase values in a complex frequency domain.

3. The method of claim 2, comprising generating optical gradient force data by isolating optical gradient force measurements as those optical force measurements having phase values along a real axis.

4. The method of claim 1, wherein the excitation light source is modulated in the time domain using an even modulation function.

5. The method of claim 4, wherein the even modulation function comprises a square wave.

6. The method of claim 1, wherein generating the optical force data includes vibrating a cantilever of the scanning probe microscope while measuring the optical forces from the sample.

7. The method of claim 6, wherein the cantilever is vibrated at a dithering frequency and the excitation light source is modulated at an optical modulation frequency that is different from the dithering frequency.

8. The method of claim 7, comprising generating topography data from the optical force data having frequency components at the dithering frequency, wherein the topography data indicate a topography of the sample.

9. A method for decoupled optical force nanoscopy, comprising:

(a) illuminating a sample with temporally modulated laser light;

(b) acquiring optical force data by scanning a cantilever over the sample to measure optical forces generated by illuminating the sample with the temporally modulated laser light;

(c) analyzing the optical force data in a frequency domain to separate the optical force data into different components; and (d) storing the separated components of the optical force data.

10. The method of claim 9, wherein analyzing the optical force data in the frequency domain comprises separating the optical force data into the different components based on phase values of the optical force data.

11. The method of claim 10, comprising separating the optical force data into a first force component based on phase values having both real and imaginary components, and a second force component based on phase values having only real components.

12. The method of claim 9, wherein the temporally modulated laser light is modulated by an even modulation function.

13. The method of claim 12, wherein the even modulation function comprises a square-wave function.

* * * * *